No. 698,021. Patented Apr. 22, 1902.
F. M. HUNT.
HORSE DETACHER.
(Application filed July 25, 1901.)
(No Model.)
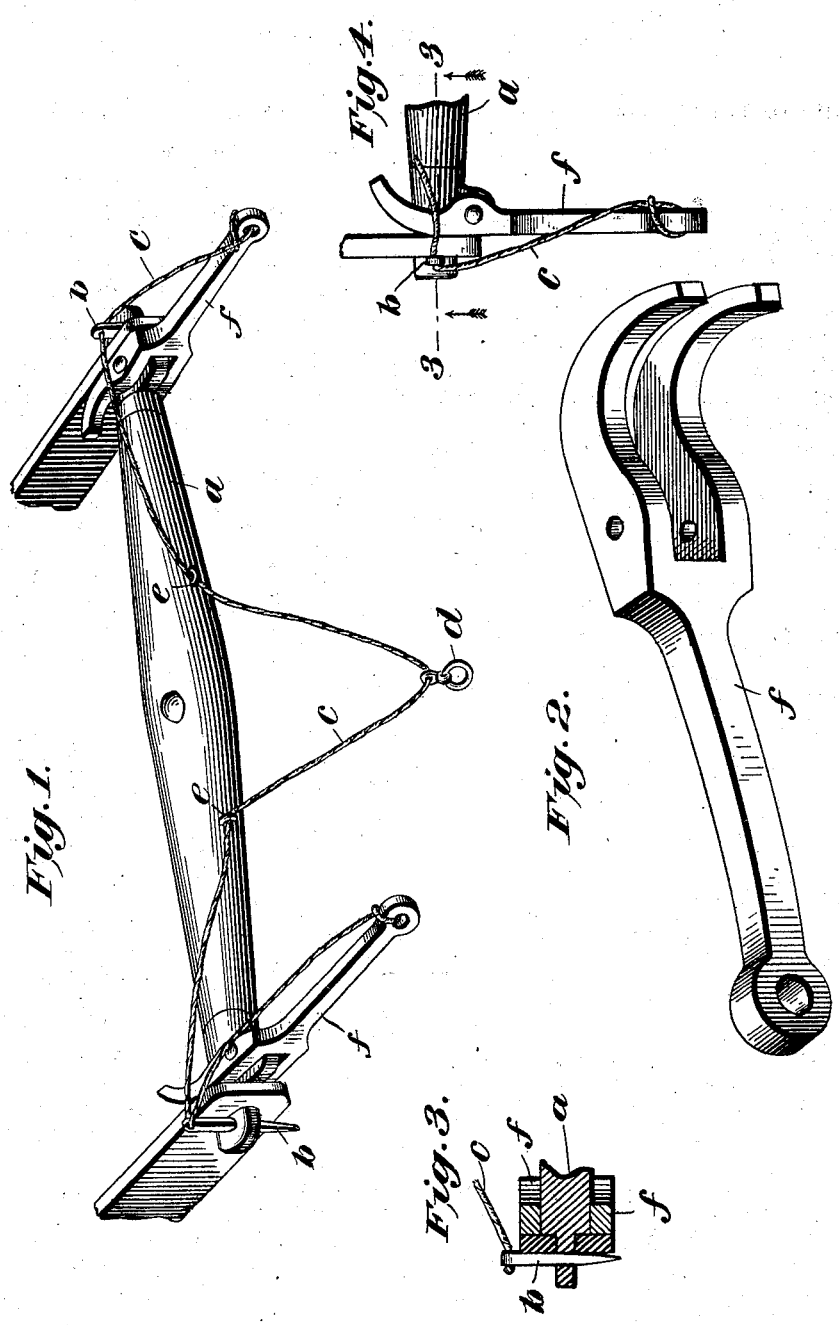
Witnesses:
Elmer Leavey.
R. H. Bishop.
Inventor,
Frank M. Hunt,
By Davis & Davis
Attorneys.

UNITED STATES PATENT OFFICE.

FRANK M. HUNT, OF ROUNDOAK, GEORGIA.

HORSE-DETACHER.

SPECIFICATION forming part of Letters Patent No. 698,021, dated April 22, 1902.

Application filed July 25, 1901. Serial No. 69,731. (No model.)

*To all whom it may concern:*

Be it known that I, FRANK M. HUNT, a citizen of the United States of America, residing at Roundoak, in the county of Jones and State of Georgia, have invented certain new and useful Improvements in Horse-Detachers, of which the following is a specification, reference being had therein to the accompanying drawings, in which—

Figure 1 represents a perspective view of my device; Fig. 2, a perspective view of the throw-off lever in detail; Fig. 3, a detail section through the line 3 3 of Fig. 4, and Fig. 4 a plan view of one end of the singletree.

The object of this invention is to provide simple devices for releasing the traces from the singletree when the animal becomes dangerously fractious and it is therefore desirable to detach him from the vehicle, these releasing devices being actuatable from the driver's seat, as more fully hereinafter set forth.

This detaching device is especially adapted to be used in combination with an improved safety-harness covered in my application for patent, Serial No. 50,353, filed March 8, 1901, and allowed May 28, 1901, in which the harness is so constructed that upon the release of the traces from the singletree the animal may pass from between the shafts, carrying the harness with it. It will be obvious, however, that it may with equal advantage be used in connection with any style of harness which is adapted to disengage itself from the shafts when the traces are released.

Referring to the drawings by letters, $a$ designates a singletree, and $b$ the ordinary leather trace-pin inserted in holes in the ends of the singletree and adapted to prevent the traces from being accidentally detached from the singletree.

To detach the traces from the singletree from the driver's seat, I employ a pair of cords $c$, which are connected together by a pull-ring $d$, which is to be hung up loosely upon a hook or nail within easy reach of the driver. These cords are passed through guide-eyes $e$ on the singletree and are connected, respectively, to the upper ends of the leather pins $b$, employed to hold the traces on the respective ends of the singletree, so that when the cords are pulled on said pins will be withdrawn and the traces will be free to pass off the ends of the singletree. To insure the traces passing off the ends of the singletree, I pivot a throw-off lever $f$ at each end of the singletree on the rear edge thereof and connect their respective ends to the extremities of the respective cords at a point beyond the connection to the respective trace-pins $b$. The forward end of each of these levers is bifurcated, so as to embrace the singletree and press on the trace both above and below the singletree and insure a positive release of the trace. The two arms formed by thus bifurcating the lever are curved forward and inward, so that when they are swung outward to throw off the trace they will have a broad positive bearing on the inner side of the same above and below the trace-hook throughout their throw-off movement, this being essential by reason of the fact that when the animal is running away the traces are drawn very taut and only a strong positive movement will shove them off the trace-hooks. It will be observed that the forked arms of each lever embrace the end of the singletree or the ferrule on the end of the same, so that they permit the trace to be attached to the singletree hooks or pins in the usual manner, thereby avoiding the necessity of lengthening the hooks or pins and the noise and wear that would result were the forked arms to be arranged so as to embrace the trace hook or pin and lie between the trace and the end of the singletree. It will be seen, further, that the curvature of the forked arms begins at a point opposite the trace-hook, so that when the lever is operated to throw off the trace the first pressure is brought to bear upon the trace in line with the trace-hook, whereby there will be no buckling or bending of the trace, but that it will be forced positively and quickly off the trace-hook even though it be under great tension, as when the animal is running away.

It will be seen that when the cords are pulled the trace-pins will be withdrawn first, and then with a further pull on the cords the rear ends of the throw-off levers will be drawn inward and the traces pushed off the ends of the singletree.

Having thus fully described my invention, what I claim, and desire to obtain by Letters Patent, is—

In combination, a singletree having a trace-hook at each end, trace-pins for holding the traces on the respective trace-hooks, a throw-off lever pivoted at each end of the singletree, the forward end of each lever being bifurcated and having its two arms embrace the singletree proper, one arm above and the other beneath the singletree and both arms lying just inside of the shoulder at the end of the singletree, both said arms being curved forward and inward from a point opposite the trace-hooks, and means for withdrawing the trace-pins and operating the throw-off levers, for the purposes set forth.

In testimony whereof I hereunto affix my signature, in the presence of two witnesses, this 3d day of July, 1901.

FRANK M. HUNT.

Witnesses:
L. W. GRAY,
J. T. WILBUR.